United States Patent

Teraoka et al.

[11] Patent Number: 5,823,907
[45] Date of Patent: Oct. 20, 1998

[54] ACCESS HOLE FOR DIFFERENTIAL APPARATUS

[75] Inventors: Masao Teraoka; Takayuki Wakaizumi, both of Tochigi, Japan; John J. Schoeberle, Warren, Mich.

[73] Assignee: Tochigi Fuji Sangyo Kabushiki Kaisha, Japan

[21] Appl. No.: 865,225

[22] Filed: May 29, 1997

[30] Foreign Application Priority Data

May 30, 1996 [JP] Japan .................................... 8-136955

[51] Int. Cl.⁶ .................................................. F16H 48/10
[52] U.S. Cl. ........................ 475/248; 475/252; 74/606 R
[58] Field of Search ................... 475/248, 249, 475/252; 74/606 R

[56] References Cited

U.S. PATENT DOCUMENTS

| | | | |
|---|---|---|---|
| 1,389,580 | 9/1921 | Davis | 475/252 |
| 1,389,720 | 9/1921 | Ward | 74/464 |
| 1,499,763 | 7/1924 | Davis | 475/338 |

(List continued on next page.)

FOREIGN PATENT DOCUMENTS

| | | | |
|---|---|---|---|
| 130806 | 6/1987 | European Pat. Off. . | |
| 1105103 | 11/1955 | France . | |
| 2126823 | 10/1972 | France . | |
| 2553169 | 4/1985 | France . | |
| 369548 | 2/1923 | Germany . | |
| 1086136 | 1/1961 | Germany . | |
| 1164187 | 2/1964 | Germany | 74/462 |
| 2305306 | 8/1974 | Germany . | |
| 2848206 | 5/1980 | Germany . | |
| 3931745 | 3/1991 | Germany . | |
| 4013196 | 10/1991 | Germany . | |
| 4013202 | 10/1991 | Germany . | |
| 4017800 | 12/1991 | Germany . | |
| 4027368 | 3/1992 | Germany . | |
| 4137931 | 5/1992 | Germany . | |
| 4223374 | 1/1994 | Germany . | |
| 51-144637 | 11/1976 | Japan . | |
| 54-54765 | 4/1979 | Japan . | |
| 54-69257 | 5/1979 | Japan . | |
| 55-3058 | 1/1980 | Japan . | |
| 55-64550 | 5/1980 | Japan . | |
| 59-97346 | 6/1984 | Japan . | |
| 59-141254 | 9/1984 | Japan . | |
| 60-81275 | 6/1985 | Japan . | |
| 62-200071 | 9/1987 | Japan . | |
| 2010145 | 3/1994 | Russian Federation . | |
| 1421-933 | 9/1988 | U.S.S.R. . | |
| 1442-772 | 12/1988 | U.S.S.R. . | |
| 917132 | 1/1963 | United Kingdom . | |
| 1136959 | 12/1968 | United Kingdom . | |
| 1142960 | 2/1969 | United Kingdom . | |
| 1256990 | 11/1970 | United Kingdom . | |
| WO 85/04936 | 11/1985 | WIPO . | |
| WO 86/02420 | 4/1986 | WIPO . | |

*Primary Examiner*—Khoi Q. Ta
*Attorney, Agent, or Firm*—Graham & James LLP

[57] ABSTRACT

A differential apparatus includes a differential casing, a pair of output side gears, a pair of output shafts connected to the output side gears, four pairs of long and short accommodating bores formed in the differential casing and long and short pinion gears accommodated in the accommodating bores. In arrangement, these pairs of accommodating bores are divided equally in the circumferential direction of the differential casing. The output shafts are prevented from slipping out of the differential casing by C-shaped clips. These accommodating bores are arranged so that, between two neighboring pairs of accommodating bores in the circumferential direction, the short accommodating bore in the one pair adjoins the short accommodating bore of the other pair. The differential casing is provided with an elongated hole which substantially bridges the adjoining short accommodating bores. By inserting a spacer into the elongated hole, the positioning of both output side gears and the output shafts in the casing can be accomplished.

10 Claims, 10 Drawing Sheets

U.S. PATENT DOCUMENTS

| | | | |
|---|---|---|---|
| 2,269,734 | 1/1942 | Powell | 475/252 |
| 2,791,919 | 5/1957 | Wildhaber | 475/252 X |
| 2,869,399 | 1/1959 | Miles | 475/231 X |
| 3,021,731 | 2/1962 | Stoeckicht et al. | 475/252 |
| 3,071,314 | 1/1963 | Flanagan | 230/143 |
| 3,251,244 | 5/1966 | Nickell | 475/252 X |
| 3,412,632 | 11/1968 | McFiggans | 475/252 X |
| 3,528,323 | 9/1970 | Kamlukin | 475/252 X |
| 3,706,239 | 12/1972 | Myers | 475/252 X |
| 3,768,336 | 10/1973 | Wharton | 475/252 X |
| 4,365,524 | 12/1982 | Bissett et al. | 475/249 |
| 4,677,876 | 7/1987 | Dissett | 475/249 |
| 4,776,234 | 10/1988 | Shea | 475/231 |
| 4,777,838 | 10/1988 | Aarestad | 74/462 X |
| 4,781,078 | 11/1988 | Blessing et al. | 475/149 |
| 4,838,118 | 6/1989 | Binkley | 475/150 |
| 4,954,122 | 9/1990 | Nakao et al. | 475/252 X |
| 5,019,021 | 5/1991 | Janson | 475/231 X |
| 5,021,038 | 6/1991 | Beigang | 475/231 X |
| 5,030,181 | 7/1991 | Keller | 475/231 |
| 5,078,660 | 1/1992 | Williams et al. | 475/206 X |
| 5,083,987 | 1/1992 | Korner et al. | 475/90 |
| 5,102,378 | 4/1992 | Gobert | 475/231 |
| 5,108,353 | 4/1992 | Brewer | 475/227 |
| 5,122,101 | 6/1992 | Tseng | 475/249 X |
| 5,139,467 | 8/1992 | Carpenter | 475/235 |
| 5,146,801 | 9/1992 | Oda | 475/221 |
| 5,147,252 | 9/1992 | Mace et al. | 475/226 |
| 5,156,578 | 10/1992 | Hirota | 475/150 |
| 5,169,370 | 12/1992 | Dye et al. | 475/227 |
| 5,194,058 | 3/1993 | Amborn et al. | 475/344 |
| 5,209,707 | 5/1993 | Teraoka | 475/249 |
| 5,242,336 | 9/1993 | Hori | 475/336 |
| 5,269,730 | 12/1993 | Hirota | 475/150 |
| 5,269,732 | 12/1993 | Weiss et al. | 475/249 |
| 5,282,775 | 2/1994 | Teraoka | 475/252 |
| 5,295,923 | 3/1994 | Takefuta | 475/252 |
| 5,310,389 | 5/1994 | Sato | 475/252 |
| 5,326,333 | 7/1994 | Niizawa | 475/249 |
| 5,366,421 | 11/1994 | Hirota | 475/231 |
| 5,385,514 | 1/1995 | Dawe | 475/336 |
| 5,389,048 | 2/1995 | Carlson | 475/252 |
| 5,415,601 | 5/1995 | Cilano | 475/160 |
| 5,441,461 | 8/1995 | Teraoka | 475/252 |
| 5,458,546 | 10/1995 | Teraoka | 475/248 |
| 5,458,547 | 10/1995 | Teraoka et al. | 475/249 |
| 5,492,510 | 2/1996 | Bowerman | 475/252 |
| 5,507,703 | 4/1996 | Madsack et al. | 475/248 |
| 5,554,081 | 9/1996 | Bowerman | 475/252 |
| 5,556,351 | 9/1996 | Hiraishi et al. | 475/160 |
| 5,562,562 | 10/1996 | Teraoka | 475/248 |
| 5,580,326 | 12/1996 | Teraoka | 475/248 |
| 5,620,389 | 4/1997 | Sato | 475/249 |
| 5,713,812 | 2/1998 | Hiraishi et al. | 475/252 |
| 5,728,024 | 3/1998 | Ishizuka et al. | 475/252 |
| 5,733,216 | 3/1998 | Bowerman | 475/252 |

ACCESS HOLE FOR DIFFERENTIAL APPARATUS

BACKGROUND OF THE INVENTION

The present invention relates to a differential apparatus installed in a vehicle.

Figure 1:
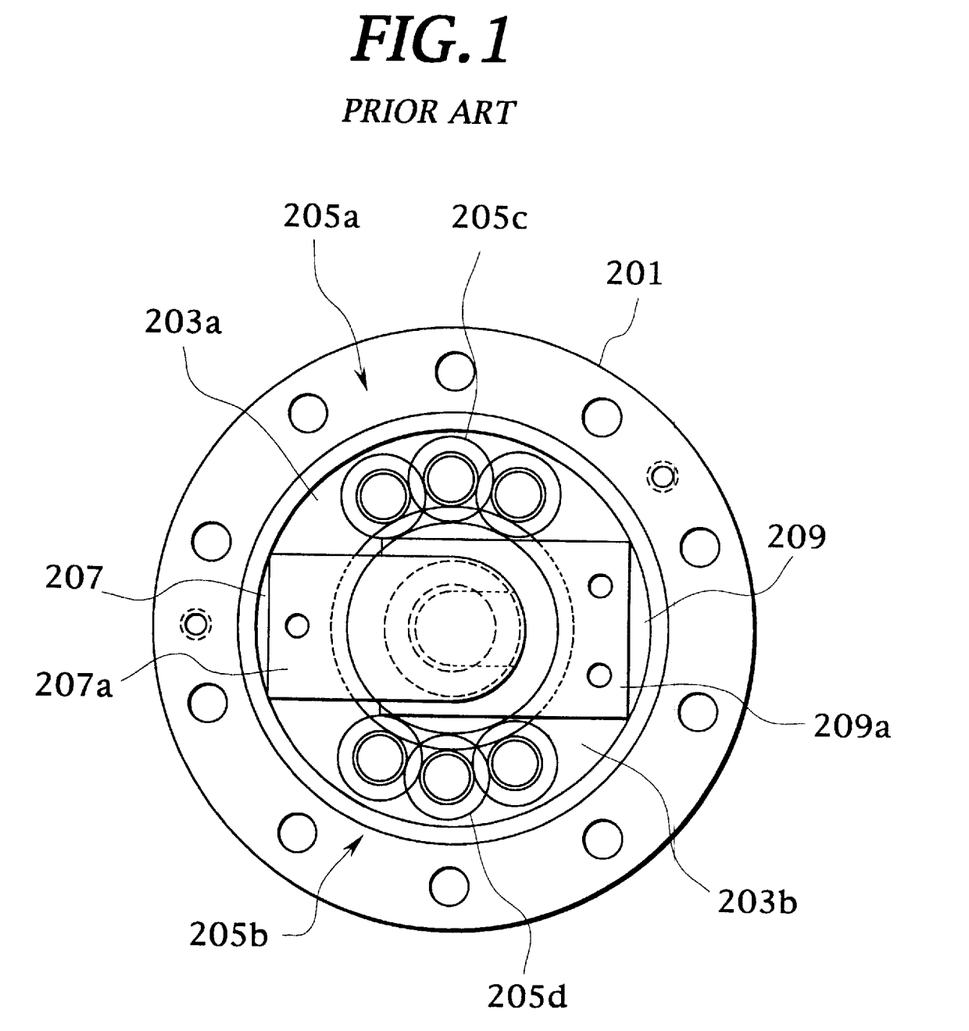
FIG. 1 is a cross sectional view of an essential part of a differential apparatus in the prior art.
Figure 2:
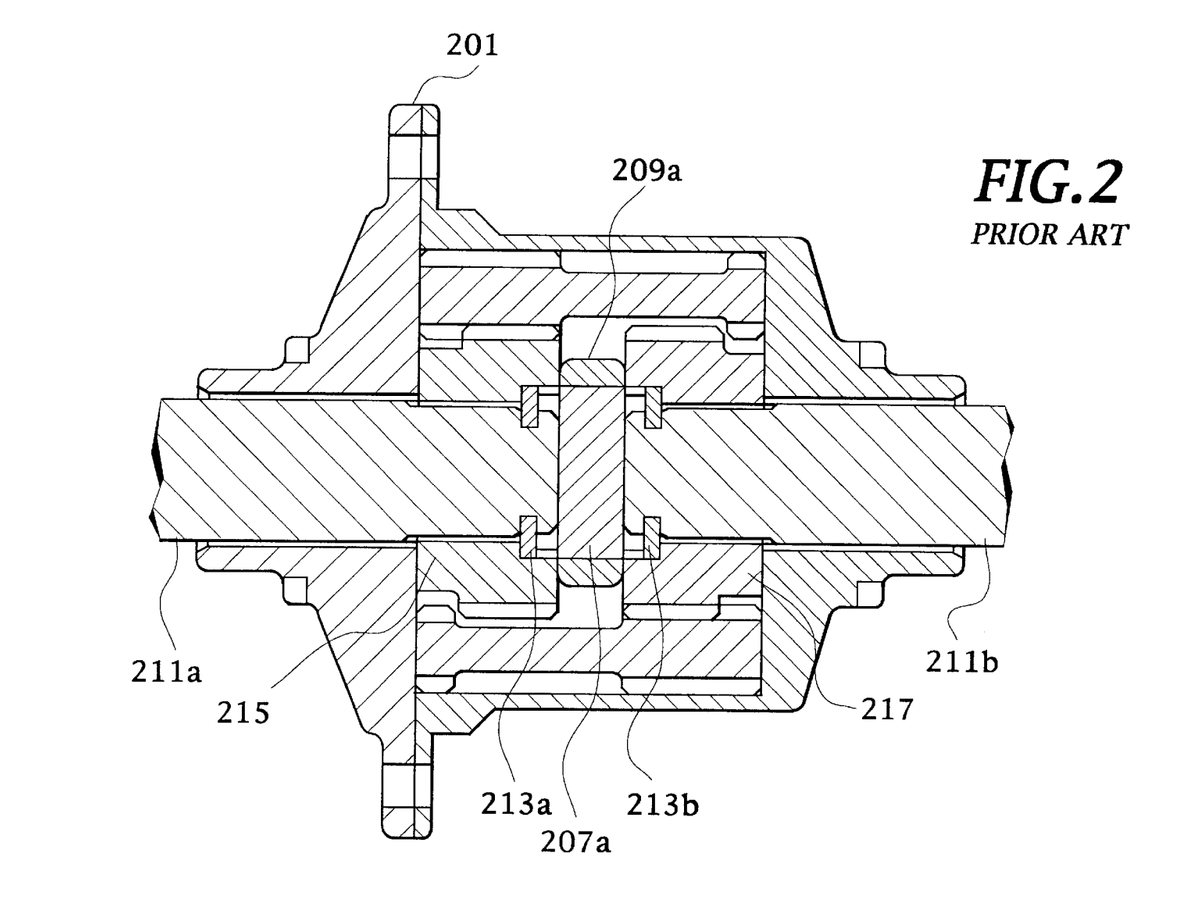
FIG. 2 is a cross sectional view of the differential apparatus of FIG. 1.

A differential apparatus as shown in FIGS. 1 and 2 is disclosed in Japanese Patent Unexamined Publication (kokai) No. 6-323373.

The differential apparatus of the "parallel-shaft" type is provided with arch-shaped accommodating portions 203a, 203b which are arranged in symmetry with each other by 180° and which rotate together with a differential casing 201 in one body. Respectively accommodated so as to frictionally rotate in accommodating holes formed in the accommodating portions 203a, 203b are two pinion-gear sets 205a, 205b each of which consists of three pinion gears. Two elongated holes 207, 209 are formed in a peripheral wall (part) of the differential casing 201 between the pinion-gear sets 205a and 205b. Axle spacing elements 207a, 209a are inserted and secured in the elongated holes 207, 209, respectively.

With the above-mentioned arrangement, differential limiting force can be ensured by sliding friction between the accommodating holes and the pinion-gear sets 205a, 205b. Further, through the elongated holes 207, 209, a pair of C-shaped clips 213a, 213b are installed in order to prevent axles 211a, 211b from slipping out of the differential casing 201. In addition, the elongated holes 207, 209 are also utilized in positioning side gears 215, 217 and the axles 211a, 211b.

As mentioned above, since the C-shaped clips 213a, 213b serve to prevent the axles 211a, 211b from slipping out, two sets 205a, 205b of three pinion gears gathered are arranged symmetrically by 180°. Due to such a gathered arrangement of the pinion gears in each set 205a, 205b, three accommodating bores in each of the accommodating portions 203a, 203b must be constructed so as to have large disconnected-portions in the peripheral walls in view of the ensuring of the meshing state of the respective pinion gears (sets 205a, 205b) with the side gears 215, 217 and the mutual meshing among the pinion gears in each set 205a, 205b. Consequently, bearing areas of the accommodating bores for accommodating the pinion gears 205c, 205d at the center of the respective sets 205a, 205b are disadvantageously decreased in comparison with those of the remaining accommodating bores on both sides of the gears 205c, 205d, particularly. As a result, the sliding friction of the pinion gears decreases, so that the differential limiting force of the apparatus is reduced as the friction decreases. Furthermore, because of its unstable bearing against the central pinion gears 205c, 205d, it may cause locational wearing on respective meshing faces of the gears and an occurrence of noise.

SUMMARY OF THE INVENTION

It is therefore an object of the present invention to provide a differential apparatus which allows the C-shaped clips to prevent the axles from slipping out of the differential casing without arranging the pinion gears in the differential casing tightly.

The object of the present invention described above can be accomplished by a differential apparatus for a vehicle having an engine, the differential apparatus comprising:

a differential casing having an input gear fixed thereto, the differential casing being rotated by the engine through the intermediary of the input gear;

a pair of output side gears disposed in the differential casing so as to oppose to each other and rotate in coaxial with an axis of the differential casing;

even pairs of accommodating bores formed in the differential casing, the even pairs being divided equally in the circumferential direction of the differential casing, each of the even pairs of accommodating bores consisting of a first accommodating bore and a second accommodating bore, the first and second accommodating bores being arranged so that, between two neighboring pairs of the even pairs of accommodating bores in the circumferential direction, the first or second accommodating bore in the one pair adjoins the same accommodating bore of the other pair;

even pairs of pinion gears accommodated in the even pairs of accommodating bores so as to frictionally rotate therein and arranged in parallel with the axis of the differential casing, the each pair of pinion gears consisting of a long pinion gear accommodated in the first accommodating bore and a short pinion gear accommodated in the second accommodating bore, both of the long and short pinion gears having respective first gear portions meshing with the side gears, respectively and respective second gear portions meshing with each other;

a pair of output shafts connected to the output side gears, respectively so as to rotate therewith;

an antidraft member for preventing the output shafts from slipping out of the differential casing in the axial direction; and a positioning member for positioning the output side gears and the output shafts, the positioning member being in the form of a plate;

wherein the differential casing is provided with an elongated hole which is formed so as to penetrate a peripheral wall of the differential casing at axial positions corresponding to opposing end faces of the output side gears, and of which the straight length in the circumferential direction of the differential casing is established in such a manner that the elongated hole substantially bridges the adjoining short accommodating bores when the short pinion gears are accommodated in the adjoining accommodating bores between the two adjoining pairs of the accommodating bores; and wherein the output side gears and the output shafts are located in respective positions by the positioning member which is inserted into the differential casing through the elongated hole and fixed with the differential casing.

With the arrangement mentioned above, it is possible for an operator to fit the antidraft member into the output shafts through the elongated hole. Further, by inserting and sequent fixing the positioning member into the elongated hole, the positioning of both output side gears and the output shafts in the casing can be accomplished.

Then, the pairs of accommodating bores are arranged equally in the circumferential direction of the differential casing, different from the above-mentioned gathered arrangement of the pinion gears in the conventional differential apparatus. Consequently, the reduction in sliding bearing area between the accommodating bores and the pinion gears can be prevented, while the pinion gears are respectively carried in the accommodating bores stably. Therefore, it is possible to prevent the output shafts from slipping out of the differential casing and position both of the output side gears and the output shafts while not causing a possibility that differential limiting force is decreased.

In the present invention, preferably, the positioning member is arranged so as to come into contact with respective axial ends of the short pinion gears. Then, in addition to the above-mentioned operations and effects, since the accommodating bores for accommodating the short pinion gears exhibit through holes with no bottoms, it is possible to eliminate a finishing machining of the bottoms of the bores, which has been carried out conventionally, whereby the manufacturing cost of the differential apparatus can be reduced.

More preferably, the second gear portions of the long and short pinion gears are positioned in the vicinity of a portion of the differential casing where the input gear is fixed. In such a case, it is possible to make the best use of an inside space of the fixing portion, whereby the differential apparatus per se can be miniaturized.

In the present invention, preferably, the positioning member is fixed to the differential casing by means of a pin which is inserted into the differential casing in the axial direction.

Alternatively, the positioning member may be fixed with the differential casing by means of a pin which is inserted into the differential casing in the radial direction of the differential casing. In such a case, since the attaching direction of the pin is identical to a direction along which the antidraft member is to be fitted and the positioning member is to be inserted, it is possible to improve the workability in assembling these elements to the differential casing.

Preferably, the differential casing comprises a casing body and a cover fixed to the casing body.

More preferably, through the even pairs of accommodating bores, each of the first accommodating bores has an axial length equal to that of each of the second accommodating bores. In this case, the management of boring depth in processing both accommodating bores can be facilitated thereby to reduce the manufacturing cost of the differential casing.

Further, it is preferable that respective positions of the short pinion gears in the axial direction of the differential casing are determined by the casing body and the positioning member, while respective positions of the long pinion gears in the axial direction of the differential casing are determined by the casing body and the cover.

More preferably, the differential casing is provided, adjacent the elongated hole, with an opening through which an inside of the differential casing communicates with the outside. In this case, it is possible to introduce lubricating oil in an oil reservoir of in a differential carrier into the differential casing through the opening.

In the present invention, the antidraft member may comprise a pair of C-shaped clips which are fitted into peripheral grooves formed on the output shafts.

These and other objects and features of the present invention will become more fully apparent from the following description and appended claims taken in conjunction with the accompanying drawings.

DESCRIPTION OF THE PREFERRED EMBODIMENT

Embodiments in accordance with the present invention will be described with reference to the drawings.

[The First Embodiment]

Figure 3:
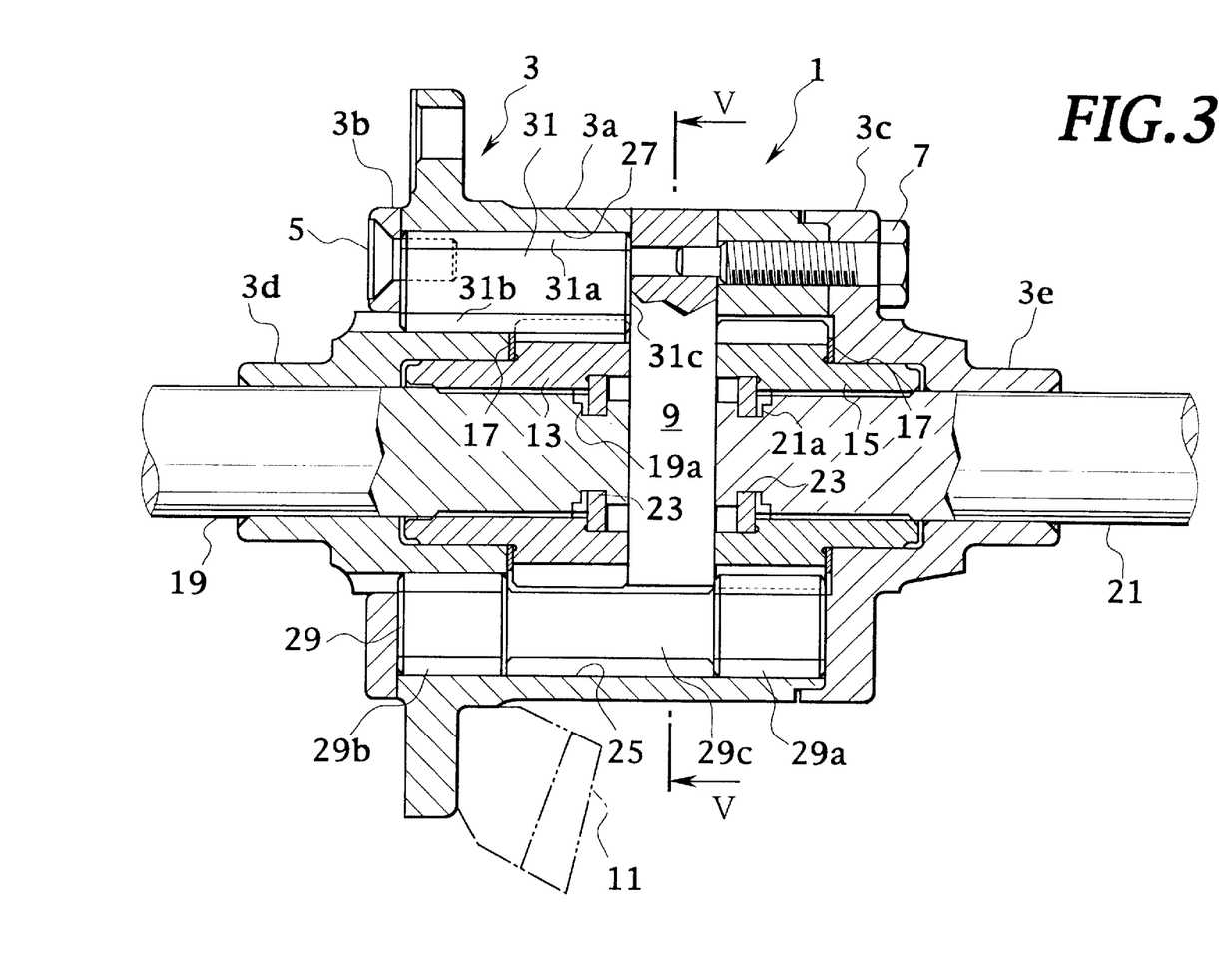
FIG. 3 is a cross sectional view of a differential apparatus in accordance with a first embodiment of the present invention.
Figure 4:
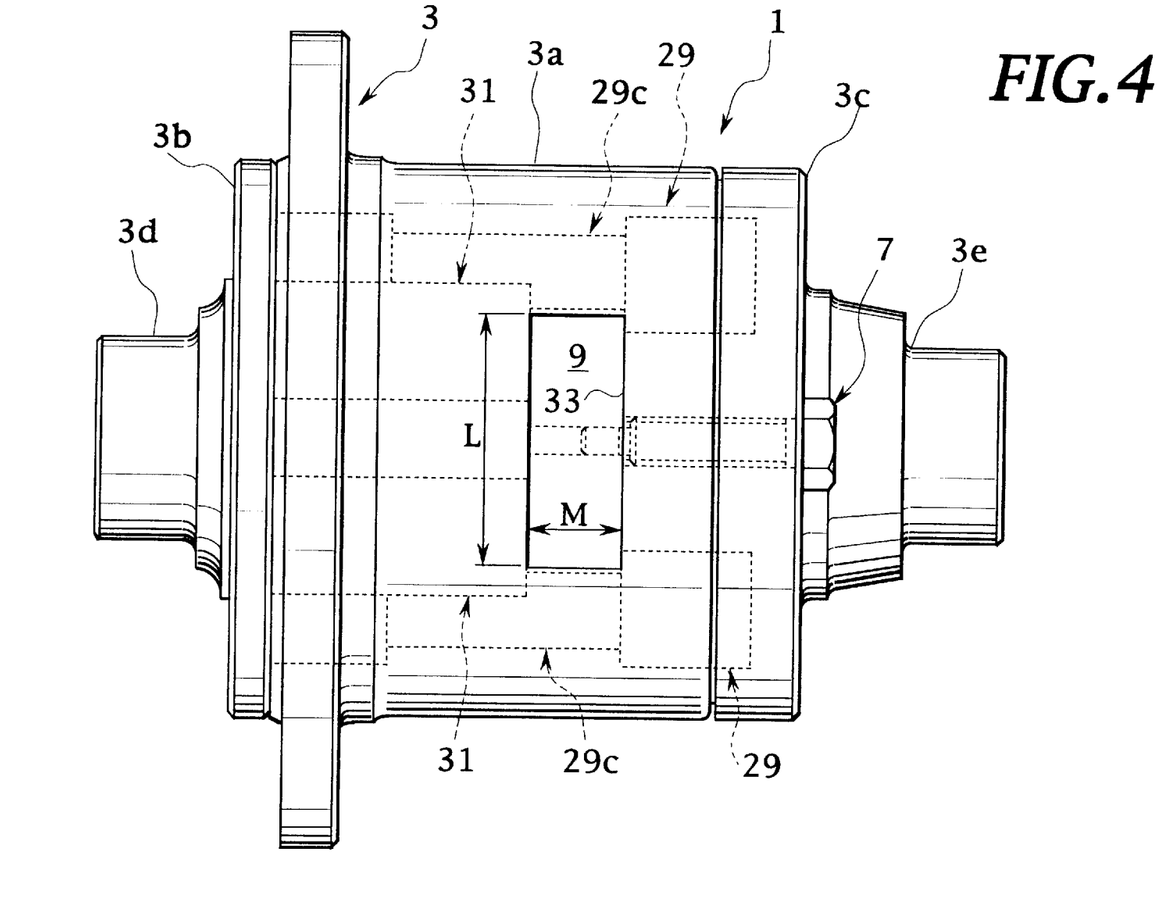
FIG. 4 is a side view of the differential apparatus of the first embodiment.
Figure 5:
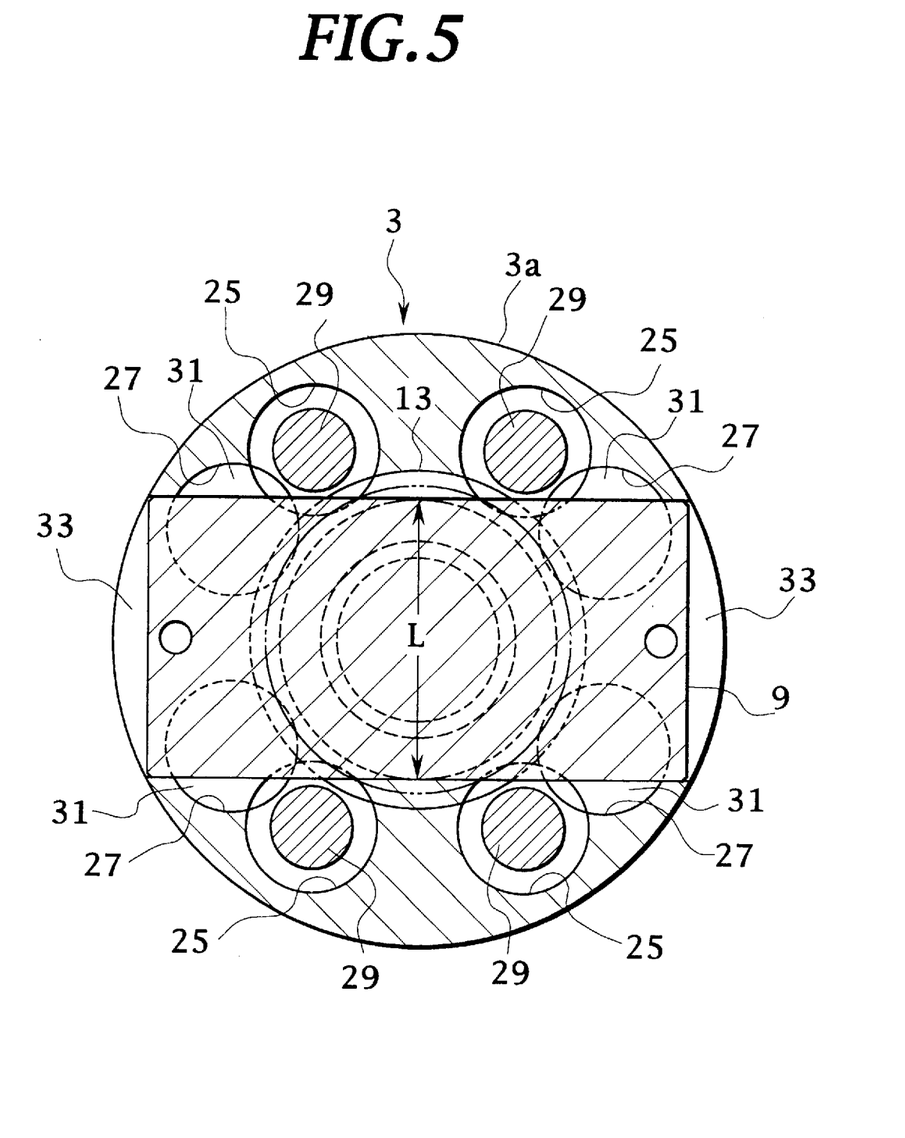
FIG. 5 is a cross sectional view taken along a line of V—V of FIG. 3.

We now describe the first embodiment of the invention with reference to FIGS. 3 to 5. In the figures, FIG. 3 is a cross sectional view of the differential apparatus in accordance with the first embodiment. Further, FIG. 4 shows a side view of the differential apparatus and FIG. 5 is a cross sectional view taken along a line of V—V of FIG. 3.

A differential casing 3 of the differential apparatus 1 consists of a casing body 3a, a left cover 3b and a right cover 3c. The left cover 3b are secured on the casing body 3a through bolts 5 one of which is shown in FIG. 3 while being shifted from the actual secured position. On the other hand, the right cover 3c is secured on the casing body 3a through not-shown bolts and fastened to the casing body 3a together with a spacer (positioning member) 9 through a bolt 7 (pin). Two of bolts 7 which connect the casing body 3a with the right cover 3c carry projections, respectively, which engage the spacer 9. The differential casing 3 is rotatably carried by a not-shown differential carrier through boss parts 3d, 3e at both ends of the casing 3. Fixed with the differential casing 3 is a ring gear 11 as an input gear through which a driving force of the engine is transmitted to the differential casing 3 for its rotation.

At an axle part of the differential casing 3, left and right output side gears 13, 15 are arranged to oppose to each other. Washers 17, 17 are interposed between the walls of the differential casing 3 and the left and right side gears 13, 15, respectively. A pair of output shafts 19, 21 are spline-connected with the inner peripheries of the side gears 13, 15, respectively. The output shafts 19, 21 are provided, about opposing end portions thereof, with grooves 19a, 21a into which C-shaped clips 23, 23 as antidraft members are fitted for preventing the output shafts 19, 21 from slipping to the outside of the differential casing 3. A method of fitting the C-shaped clips 23, 23 will be described later.

As shown in FIG. 5, the differential casing 3 of the embodiment has four pairs of long (first) and short (second) accommodating bores 25, 27 formed so as to extend in parallel with an axis for rotation of the casing 3 and separated equally in the circumferential direction. A short pinion gear 31 is accommodated in each of the short accommodating bores 27 so as to frictionally rotate therein, while a long pinion gear 29 is accommodated in each of the long accommodating bores 25.

Each of the long pinion gears 29 consists of a first gear portion 29a, a second gear portion 29b and an axle portion 29c for connecting the first gear portion 29a with the second gear portion 29b. In FIG. 3, the first gear portion 29a meshes with the right side gear 15. Similarly, each of the short pinion gears 31 consists of a first gear portion 31a and a second gear portion 31b continuing that first gear portion 31a. The first gear portion 31a of the short pinion gear 31 is arranged so as to mesh with the left side gear 13. Adjacent to a fixing portion of the ring gear 11 in the axial direction of the differential apparatus 1, the second gear portion 31b of each short pinion gear 31 meshes with the second gear portion 29b of each long pinion gear 29. All of the side gears 13, 15 and the long and short pinion gears 29, 31 are constituted by helical gears.

Further, the differential casing 3 is provided with an elongated hole 33 in the form of a rectangle of a width M (i.e. a dimension in the axial direction of the differential casing) and a length L (i.e. a "straight" dimension in the circumferential direction of the differential casing), which penetrates the peripheral wall of a cylindrical portion of the casing 3 perpendicular to an axis of the apparatus 1.

As shown in FIG. 3, the elongated hole 33 is positioned so that opposing side walls thereof generally align with the opposite faces of the side gears 13, 15, respectively, and the center of the hole 33 in the axial direction is shifted from a center of the cylindrical portion to the right hand by a predetermined dimension. The length L of the elongated hole 33 is established so that the so-formed hole 33 is substantially laid across the adjoining short accommodating bores 27, 27 in the two pairs of accommodating bores 25, 27 symmetrically arranged up and down in FIG. 5. Note, the above-mentioned penetrating direction of the elongated hole 33, which is perpendicular to the axis of the differential casing 3, corresponds to a horizontal direction in FIG. 5.

Inserted into the elongated hole 33 is a rectangular spacer 9 which is fastened to the casing body 3a together with the right cover 3c by the above-mentioned bolt 7. Under condition that the spacer 9 is inserted into the hole 33, an inside end face 31c of the short pinion gear 31 comes into contact with the spacer 9, as shown in FIG. 3. Further, the length L of the elongated hole 33 is so established that, when inserted into the hole 33, the spacer 9 does not interfere with the axle portions 29c of the long pinion gears 29 through designated clearances.

We now describe a method of fitting the C-shaped clips 23, 23 to the output shafts 19, 21, another method of positioning the side gears 13, 15 relative to the shafts 19, 21 and an operation of the differential apparatus 1.

In order to fit the C-shaped clips 23, 23 to the output shafts 19, 21, for example, the left output shaft 19 is firstly depressed to a position where the end of the shaft 19 is visible through the elongated hole 33 of the differential casing 3. Then, the C-shaped clip 23 is put into the differential casing 3 through the elongated hole 33 to engage into the groove 19a of the output shaft 19. In the same way, the remaining C-shaped clip 23 is also fitted to the opposite output shaft 21. Consequently, the output shafts 19, 21 can be prevented from slipping out of the differential casing 3.

Next, the spacer 9 is inserted into the elongated hole 33 and then fastened into the differential casing 3 together with the cover 3c by means of the bolts 7 (two pieces). Note, at this time, the cover 3c per se has been already fixed to the differential casing 3 by not-shown bolts. According to the embodiment, since the axial position of the elongated hole 33 is shifted to the right hand, the spacer 9 does not interfere with the ring gear 11 during the fitting operation of the spacer 9. In this way, by the abutment on the spacer 9, the positioning of the side gears 13, 15 and the output shafts 19, 21 in the differential casing 3 can be accomplished.

In operation, when the driving force of the engine is inputted to the differential casing 3 through the intermediary of the ring gear 11, the driving force is transmitted to the pinion gears 29, 31 and then outputted from the side gears 13, 15 to the left and right output shafts 19, 21. Hereat, if a difference in driving resistance is produced between the left and right output shafts 19, 21, the driving force is differentially divided into the left and right output shafts 19, 21 by the pinion gears 29, 31. At this time, due to the meshing of the side gears 13, 15 with the pinion gears 29, 31, a differential limiting force is produced by one sliding friction between pinion gears 29, 31 and the accommodating bores 25, 27 and another sliding friction caused by thrust force of the helical gears, so that the driving force for the output shaft on the low-speed side can be increased. Then, frictional surfaces of a sufficient area are ensured between the spacer 9 and the short pinion gears 31 (see FIG. 5).

In this way, according to the embodiment, since the accommodating bores 25, 27 are arranged equally in the circumferential direction, the reduction in sliding frictional surface can be prevented, so that the pinion gears 29, 31 are respectively carried in the accommodating bores 25, 27 stably, far from reducing the differential limiting force.

Further, since the short pinion gears 31, 31 are arranged in the accommodating bores 27, 27 adjoining between the adjoining pairs of the accommodating bores 25, 27, the arrangement allows the C-shaped clips 23 to be fitted to the output shafts 19, 21 through the elongated hole 33 in order to prevent the shafts 19, 21 from slipping out of the differential casing 3. In addition, owing to the arrangement, the insertion of the spacer 9 into the elongated hole 33 makes it possible to arrange the side gears 13, 15 and the output shafts 19, 21 in positions.

Additionally, the arrangement where the end faces 31c of the short pinion gears 31 abut on the spacer 9 allows the short accommodating bores 27 to be constructed in the form of "through holes" having no bottoms. Therefore, it is possible to eliminate the conventional finishing machining of the bottoms of the bores 27, whereby the manufacturing cost of the differential apparatus 1 can be reduced.

As the second gear portions 29b, 31b of the pinion gear 29, 31 are arranged in the vicinity of the fixing portion of the ring gear 11 to the differential casing 3, it is possible to make the best use of an inside space of the fixing portion, whereby the differential apparatus 1 per se can be miniaturized.

[The Second Embodiment]

Figure 6:
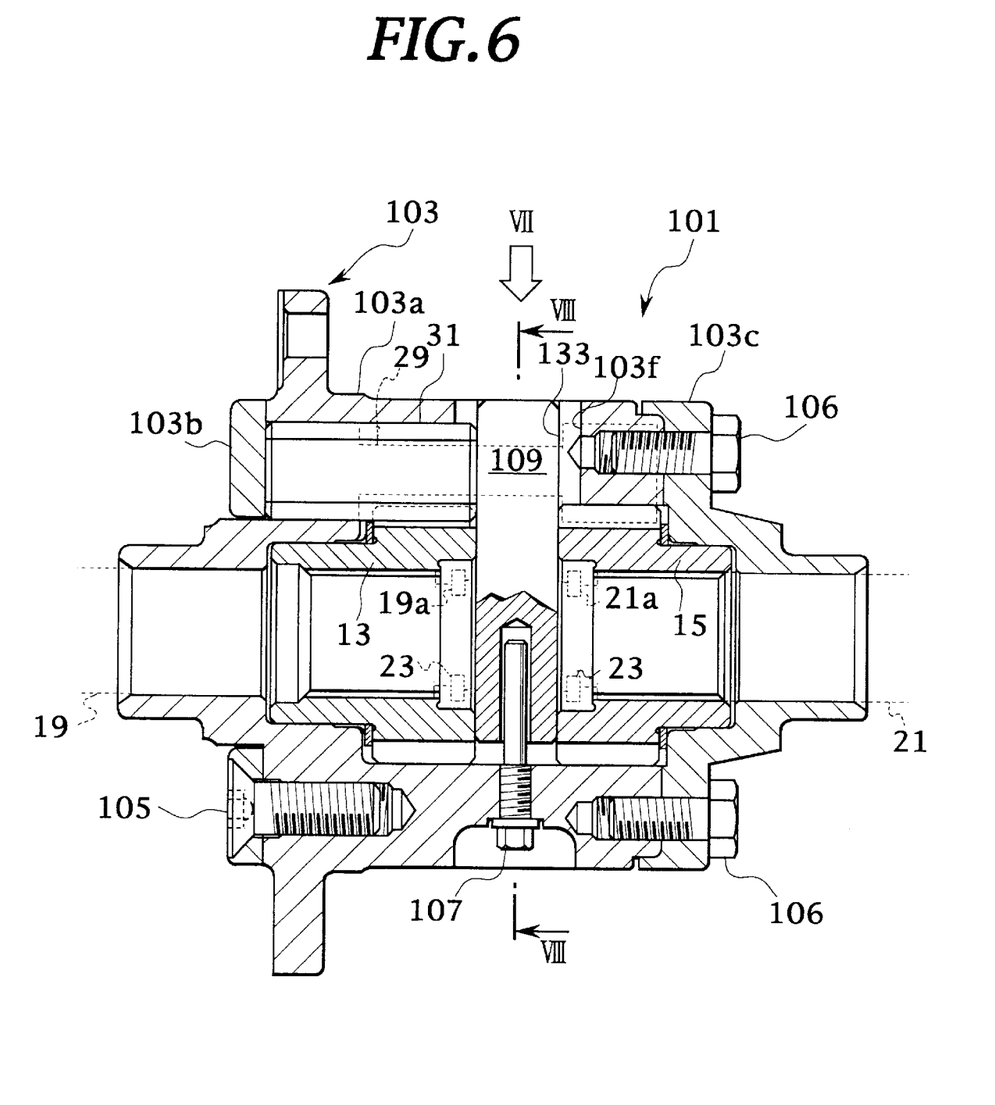
FIG. 6 is a cross sectional view of a differential apparatus of a second embodiment of the invention.
Figure 7:
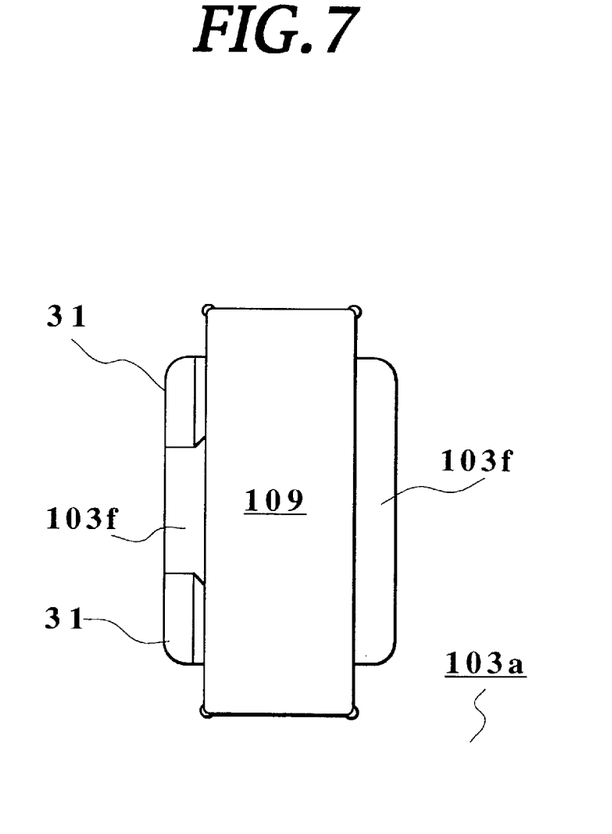
FIG. 7 is a partial side view of the differential apparatus of FIG. 6, viewed from a direction of arrow VII therein.
Figure 8:
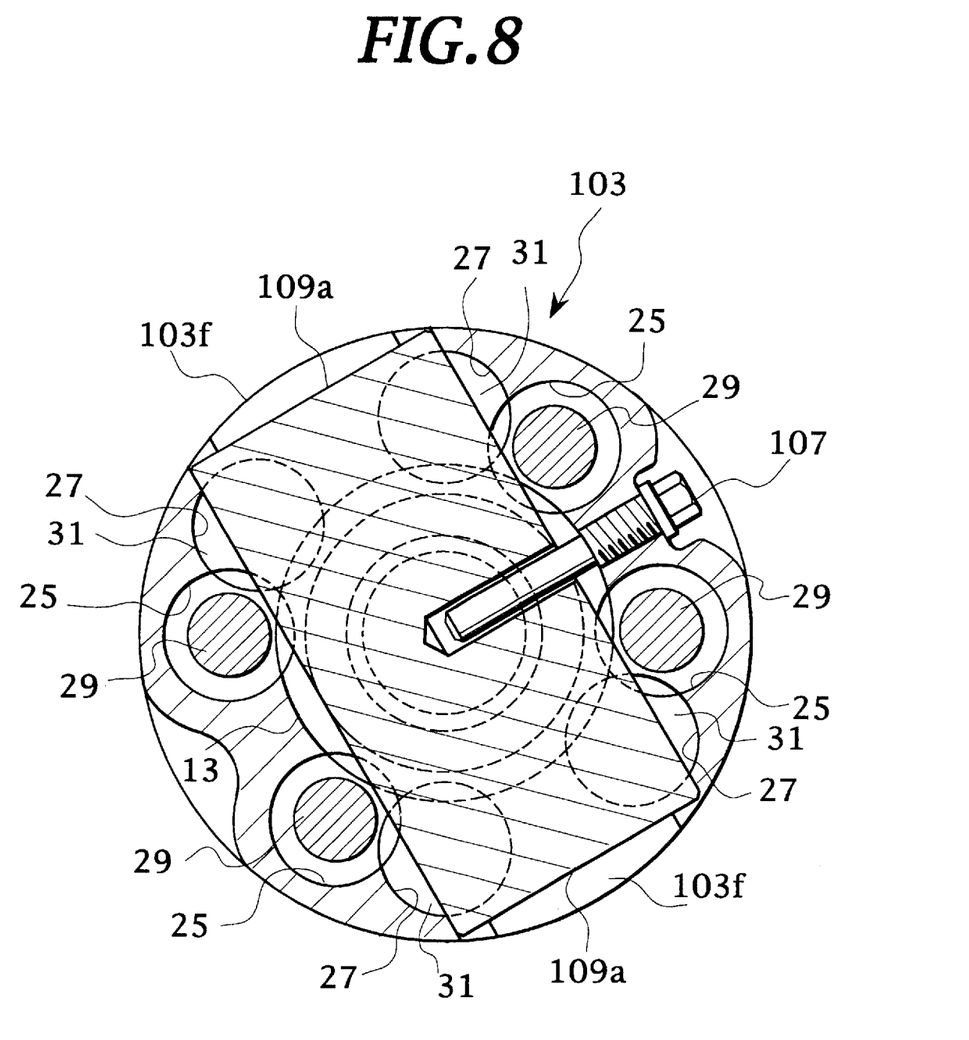
FIG. 8 is a cross sectional view taken along a line of VIII—VIII of FIG. 6.

We now describe the second embodiment of the invention with reference to FIGS. 6 to 8. In the figures, FIG. 6 is a cross sectional view of a differential apparatus 101 in accordance with the embodiment. Note, since the structure of the apparatus 101 is similar to that of the first embodiment in terms of the left and right output shafts and the above-mentioned antidraft mechanism (C-shaped clips), their elements are not shown in the figure. FIG. 7 is a partial side view of the differential apparatus 101, viewed from a direction of arrow VII of FIG. 6. FIG. 8 is a cross sectional view taken along a line of VIII—VIII of FIG. 6.

The differential apparatus 101 only differs from that of the first embodiment in respect of the fixing structure of a spacer 109 to a differential casing 103. Therefore, we only describe differences between the present embodiment and the previous embodiment upon deleting overlapping descriptions therebetween.

The differential casing 103 of the differential apparatus 101 consists of a casing body 103a, a left cover 103b secured on the casing body 103a by fastening bolts 105 and a right cover 103c secured on the casing body 103a by fastening bolts 106. On portions of the peripheral wall of the differential casing 103, which face both short sides 109a (FIG. 8) of the rectangular spacer 109, openings 103f, 103f are formed for introducing lubricating oil in an oil reservoir of the differential carrier (not-shown) into the differential casing 103, as shown in FIGS. 6 and 7.

After fitting the C-shaped clips 23 (FIG. 3) as the antidraft member and after the spacer 109 has been inserted into an elongated hole 133 formed in the peripheral wall of the differential casing 103, the spacer 109 is positioned in the differential casing 103 by means of a pin 107 inserted in the radial direction of the casing 103.

In this way, according to the second embodiment, operations and effects similar to those of the first embodiment can be accomplished. Additionally, since the attaching of the pin 107 to the casing 103 is performed in the radial direction identical to a direction along which the clips 23 are to be fitted and the spacer 109 is to be inserted, it is possible to improve the workability in assembling these elements to the differential casing 103.

Note that, as to the installation of the differential apparatus in the vehicle, there may be a case of difficulty for an operator to fix the pin (or a bolt) with the differential casing in the axial direction. In such a case, the present embodiment would be remarkably advantageous because of the above-mentioned fixing form of the pin 107 in the radial direction.

[The Third Embodiment]

Figure 9:
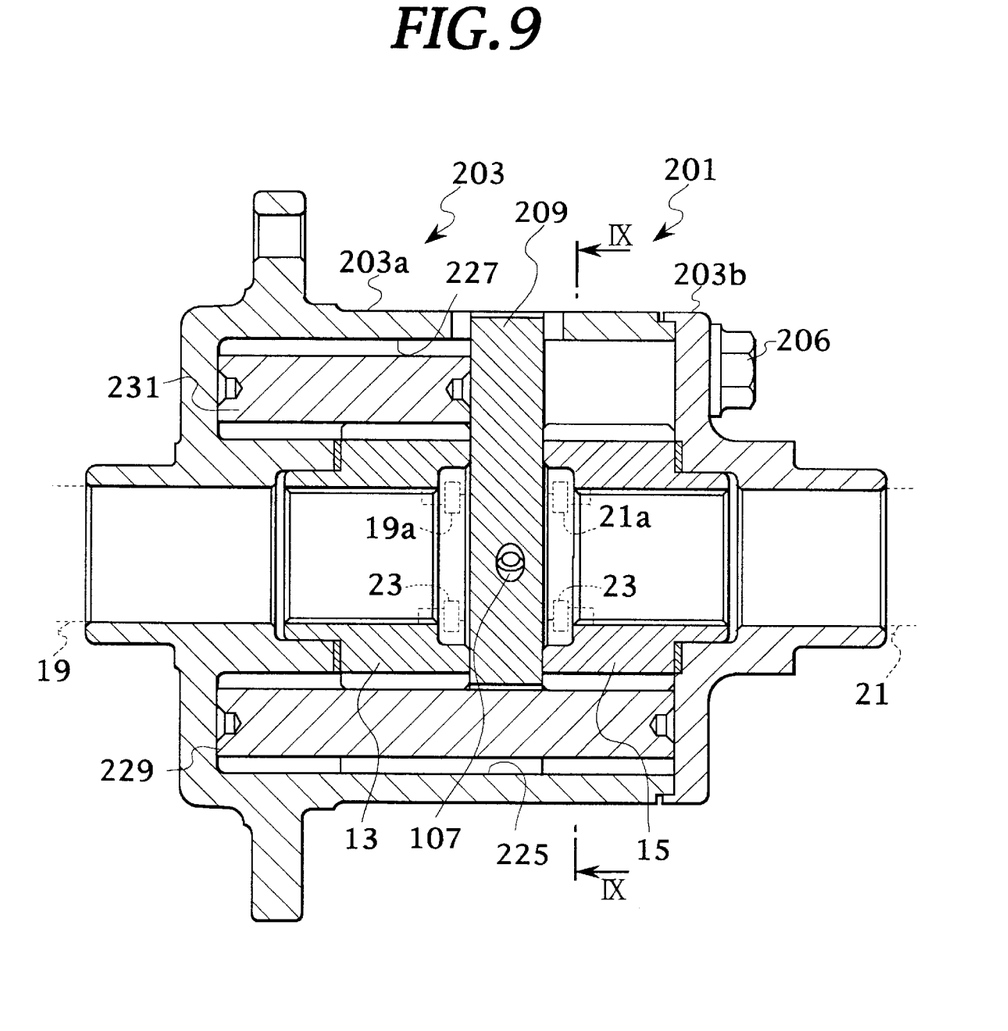
FIG. 9 is a cross sectional view of a differential apparatus of a third embodiment of the invention, which is similar to the second embodiment.
Figure 10:
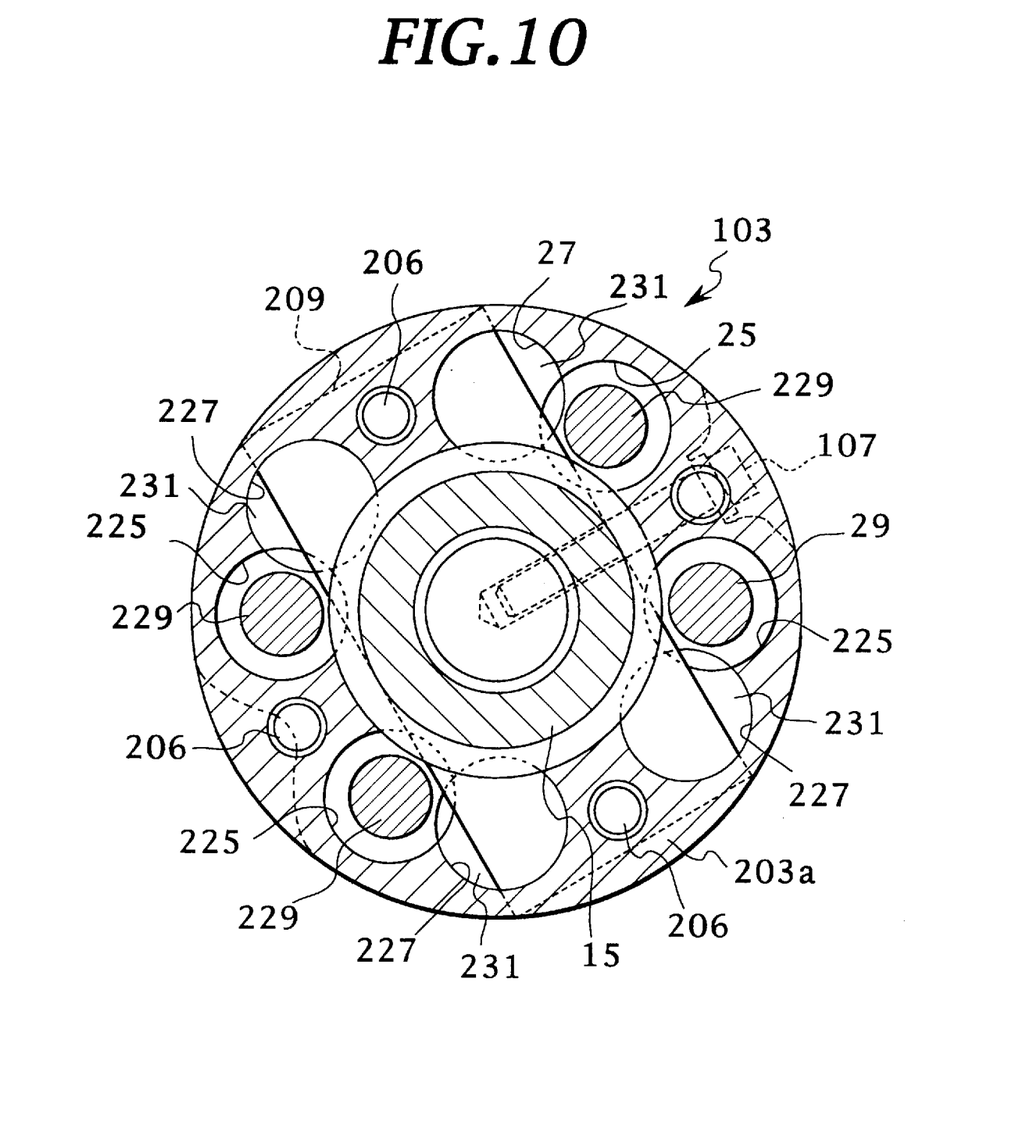
FIG. 10 is a cross sectional view taken along a line of IX—IX of FIG. 9.

We now describe the third embodiment of the invention with reference to FIG. 9. FIG. 9 is a cross sectional view of a differential apparatus 201 of the embodiment. Also in this embodiment, since the structure of the apparatus 201 is similar to that of the second embodiment in terms of the left and right output shafts and the above-mentioned antidraft mechanism (C-shaped clips), their elements are not shown in the figure.

As will be obvious from the figure, the differential apparatus 201 only differs from that of the second embodiment in respect of a differential casing 203 corresponding to the differential casing 103 of FIG. 6. Therefore, we only describe differences between the present embodiment and the second embodiment upon deleting overlapping descriptions therebetween.

The differential casing 203 of the differential apparatus 201 consists of a casing body 203a and a right cover 203b secured on the casing body 203a. The casing body 203a has first accommodating bores 225 formed to accommodate long pinion gears 229 therein and second accommodating bores 227 formed to accommodate short pinion gears 231 therein. Each of the first accommodating bores 225 (only shown in the figure) has an axial length equal to that of each of the second accommodating bores 227.

In this way, according to the third embodiment, operations and effects similar to those of the second embodiment can be accomplished, too. Since the casing body 203 can be divided into two, it is possible to reduce the number of items. Additionally, owing to the provision of the first and second accommodating bores 225, 227 of the equal lengths, the management of boring depth in processing the bores 225, 227 can be facilitated thereby to reduce the manufacturing cost of the differential casing 203. Furthermore, owing to the provision of the casing body 203 corresponding to the left cover 103b and the casing body 103a in the previous embodiment, it is possible to make the best use of a portion of the differential casing 203 in the vicinity of the fixing portion of the input gear 11 (FIG. 3), whereby the differential apparatus 201 per se can be miniaturized.

Finally, it is to be understood that the preferred embodiments disclosed therein are by way of example only and are not intended to impose limitations on the present invention, reference being had for this purpose to the claims which follow.

What is claimed is:

1. A differential apparatus for a vehicle having an engine, said differential apparatus comprising:

a differential casing having an input gear fixed thereto, said differential casing being rotated by said engine through the intermediary of said input gear;

a pair of output side gears disposed in said differential casing so as to oppose to each other and rotate in coaxial with an axis of said differential casing;

even pairs of accommodating bores formed in said differential casing, said even pairs being divided equally in the circumferential direction of said differential casing, each of said even pairs of accommodating bores consisting of a first accommodating bore and a second accommodating bore, said first and second accommodating bores being arranged so that, between two neighboring pairs of the even pairs of accommodating bores in the circumferential direction, said first or second accommodating bore in the one pair adjoins the same accommodating bore of the other pair;

even pairs of pinion gears accommodated in said even pairs of accommodating bores so as to frictionally rotate therein and arranged in parallel with said axis of said differential casing, said each pair of pinion gears consisting of a long pinion gear accommodated in said first accommodating bore and a short pinion gear accommodated in said second accommodating bore, both of said long and short pinion gears having respective first gear portions meshing with said side gears, respectively and respective second gear portions meshing with each other;

a pair of output shafts connected to said output side gears, respectively so as to rotate therewith;

an antidraft member for preventing said output shafts from slipping out of said differential casing in the axial direction; and a positioning member for positioning said output side gears and said output shafts, said positioning member being in the form of a plate;

wherein said differential casing is provided with an elongated hole which is formed so as to penetrate a peripheral wall of said differential casing at axial positions corresponding to opposing end faces of said output side gears, and of which a straight length of said elongated hole in the circumferential direction of said differential casing is established in such that said elongated hole substantially bridges said adjoining short accommodating bores when said short pinion gears are accommodated in said adjoining accommodating bores between said two adjoining pairs of said accommodating bores; and wherein said output side gears and said output shafts are located in respective positions by said positioning member which is inserted into said differential casing through said elongated hole and fixed to said differential casing.

2. A differential apparatus as claimed in claim 1, wherein said positioning member is arranged so as to come into contact with respective axial ends of said short pinion gears.

3. A differential apparatus as claimed in claim 2, wherein said second gear portions of said long and short pinion gears are positioned in the vicinity of a portion of said differential casing where said input gear is fixed.

4. A differential apparatus as claimed in claim 1, wherein said positioning member is fixed with said differential casing by means of a pin which is inserted into said differential casing in the axial direction of said differential casing.

5. A differential apparatus as claimed in claim 1, wherein said positioning member is fixed with said differential casing by means of a pin which is inserted into said differential casing in the radial direction of said differential casing.

6. A differential apparatus as claimed in claim 3, wherein said differential casing comprises a casing body and a cover fixed to said casing body.

7. A differential apparatus as claimed in claim 6, wherein, through said even pairs of accommodating bores, each of said first accommodating bores has an axial length equal to that of each of said second accommodating bores.

8. A differential apparatus as claimed in claim 7, wherein respective positions of said short pinion gears in the axial direction of said differential casing are determined by said casing body and said positioning member, while respective positions of said long pinion gears in the axial direction of said differential casing are determined by said casing body and said cover.

9. A differential apparatus as claimed in claim 1, wherein said differential casing is provided, adjacent said elongated hole, with an opening through which an inside of said differential casing communicates with the outside.

10. A differential apparatus as claimed in claim 1, wherein said antidraft member comprises a pair of C-shaped clips which are fitted into peripheral grooves formed on said output shafts.

* * * * *